United States Patent [19]
Inaba

[11] Patent Number: 5,947,575
[45] Date of Patent: Sep. 7, 1999

[54] STEREO SLIDE VIEWER AND STEREO SLIDE MOUNT

[76] Inventor: Minoru Inaba, No. 1116, Oaza Samukawa, Oyama-shi, Tochigi-ken, Japan

[21] Appl. No.: 08/972,520

[22] Filed: Nov. 18, 1997

Related U.S. Application Data

[63] Continuation of application No. 08/730,823, Oct. 17, 1996, Pat. No. 5,720,538.

[51] Int. Cl.[6] .................................................. G03B 21/00
[52] U.S. Cl. .................................................. 353/9; 353/7
[58] Field of Search .............................. 353/7, 8, 9, 10, 353/23, 24; 349/462, 464, 466, 467, 469, 473, 475, 477

[56] References Cited

U.S. PATENT DOCUMENTS

| | | | |
|---|---|---|---|
| 2,573,543 | 10/1951 | Childs | 359/469 |
| 4,026,636 | 5/1977 | Cecchini | 359/469 |
| 4,116,533 | 9/1978 | Nerlich | 359/469 |
| 4,256,367 | 3/1981 | Connors | 359/469 |
| 5,720,538 | 2/1998 | Inaba | 353/7 |

Primary Examiner—William Dowling
Attorney, Agent, or Firm—Fattibene & Fattibene; Paul A. Fattibene; Arthur T. Fattibene

[57] ABSTRACT

A stereo slide viewer can appreciate a stereo image without cutting a roll film photographed by a stereo camera. A film feeder 3 for feeding a roll film F is mounted at the rear of a table 2 of the stereo side viewer 1, and a pair of right and left projection lenses 5R and 5L are provided at the intermediate of the table 2. A pair of right and left focal plates 9R and 9L are mounted at the front of the table 2, and eyepieces 11R and 11L are installed oppositely at the focal plates 9R and 9L. The back surface of the film feeder 3 is illuminated by an illuminator, and one set of images are focused on the right and left focal plates 9R and 9L through the windows of the film feeder 3.

5 Claims, 14 Drawing Sheets

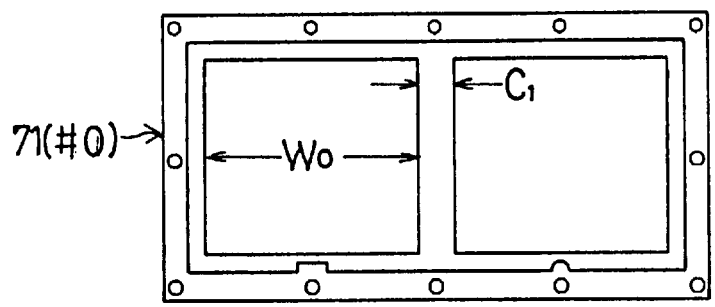
(a)
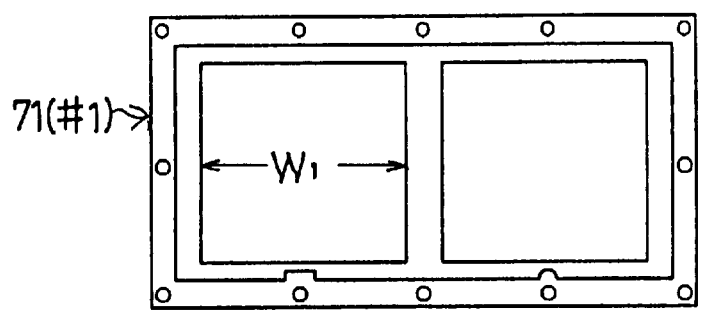
(b)
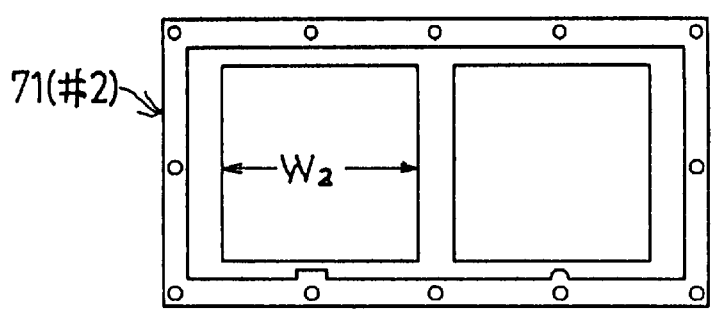
(c)
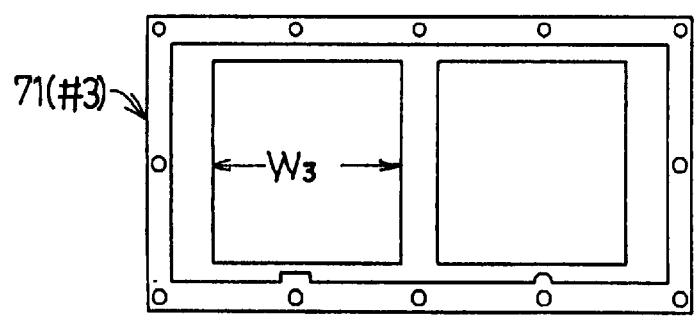
(d)
FIG 12

STEREO SLIDE VIEWER AND STEREO SLIDE MOUNT

This application is a continuation of application Ser. No. 08/730,823, filed Oct. 17, 1996, now U.S. Pat. No. 5,720,538.

BACKGROUND OF THE INVENTION

1. Field of the Invention

The present invention relates to a stereo slide viewer and a stereo slide mount and, particularly, to a stereo slide viewer which can use a roll film and a stereo slide mount having film positioning means.

2. Description of the Prior Art

A conventional stereo slide viewer has a structure that one stereo slide mount is inserted so that an image can be seen by two eyes. A developed roll film is cut at each frame, mounted in the stereo slide mount and then appreciated. In this case, it is convenient if there is a stereo slide viewer that can appreciate the roll film of long winding without cutting.

Even if the roll film is finally cut at each frame and mounted in the stereo slide mount, it is considered that the stereo slide mount is advantageous in the improvement of the efficiency of the mounting work if the roll film can be detected at the suitable picture mask amount in the roll state. This is because it is necessary to mask the non-duplicated parts occurring at the left edge of the left picture and the right edge of the right picture due to the difference of the visual fields of right and left photographing lenses when the slide taken by a general-purpose stereo camera having no lens shifting mechanism is mounted in the stereo slide mount. Since the width to be masked increases or decreases according to the distance of an object, it is necessary to select the stereo slide mount having a suitable window width from a plurality of types of stereo slide mounts having different window widths or to adjust the distance between the right and left films. Heretofore, this mounting work is manually conducted. The ratio of the degree of the work depending upon intuition and experience is large, and an error of selecting the mount or mounting position of the film feasibly occurs.

It therefore becomes necessary to solve the above-mentioned technical subject to provide a stereo slide viewer which can observe a stereo image in the state of a roll film, a stereo slide viewer which can detect a picture mask amount at the time of mounting in the state of a roll film, and a stereo slide mount in which positioning at the time of mounting is facilitated. The object of the present invention therefore is to solve the above-mentioned technical subject.

SUMMARY OF THE INVENTION

In order to accomplish the above-mentioned object, the present invention provides a stereo slide viewer comprising two right and left optical systems each including a projection lens, a focal plate and an eyepiece, and a film feeder having a pair of front and rear windows along a feeding direction of a film, wherein pictures in said pair of windows of a roll film loaded in the film feeder are individually projected to the right and left focal plates so that stereo images can be appreciated by two eyes.

The present invention further provides a stereo slide viewer further comprising an image projection magnification adjusting mechanism, a distance adjusting mechanism of the focal plates, and an interlocking mechanism of the projection magnification adjusting mechanism and the focal plate distance adjusting mechanism, wherein the inside edges of the right and left focal plates are brought into coincidence with the inside edges of the projection pictures on the focal plates by the interlocking mechanism irrespective of the projection enlarging ratio.

The present invention furthermore provides a stereo slide viewer further comprising punching units mounted above or below a pair of windows of the film feeder, wherein a notch can be formed at a predetermined position of an upper or lower edge of the film loaded in the film feeder and a stereo slide mount comprising a base frame and a cover frame aligned with two rectangular windows, wherein a positioning unit for bringing the pictures of two films into coincidence with the windows by engaging with the notches of the film formed by the punching units is formed on the film placing surface of the base frame.

BRIEF DESCRIPTION OF THE DRAWINGS

FIG. 11 illustrates a stereo slide viewer of claim 14, wherein FIG. 11(a) is an upside down inverted back view of a cover frame, FIG. 11(b) is a front view of a base frame, FIG. 11(c) is a sectional view of FIG. 11(a), and FIG. 11(d) is a sectional view of FIG. 11(b);

FIGS. 12(a), 12(b), 12(c) and 12(d) are upside down inverted back views of a cover frame of a stereo slide mount of claim 15;

DESCRIPTION OF THE PREFERRED EMBODIMENTS

Figure 1:
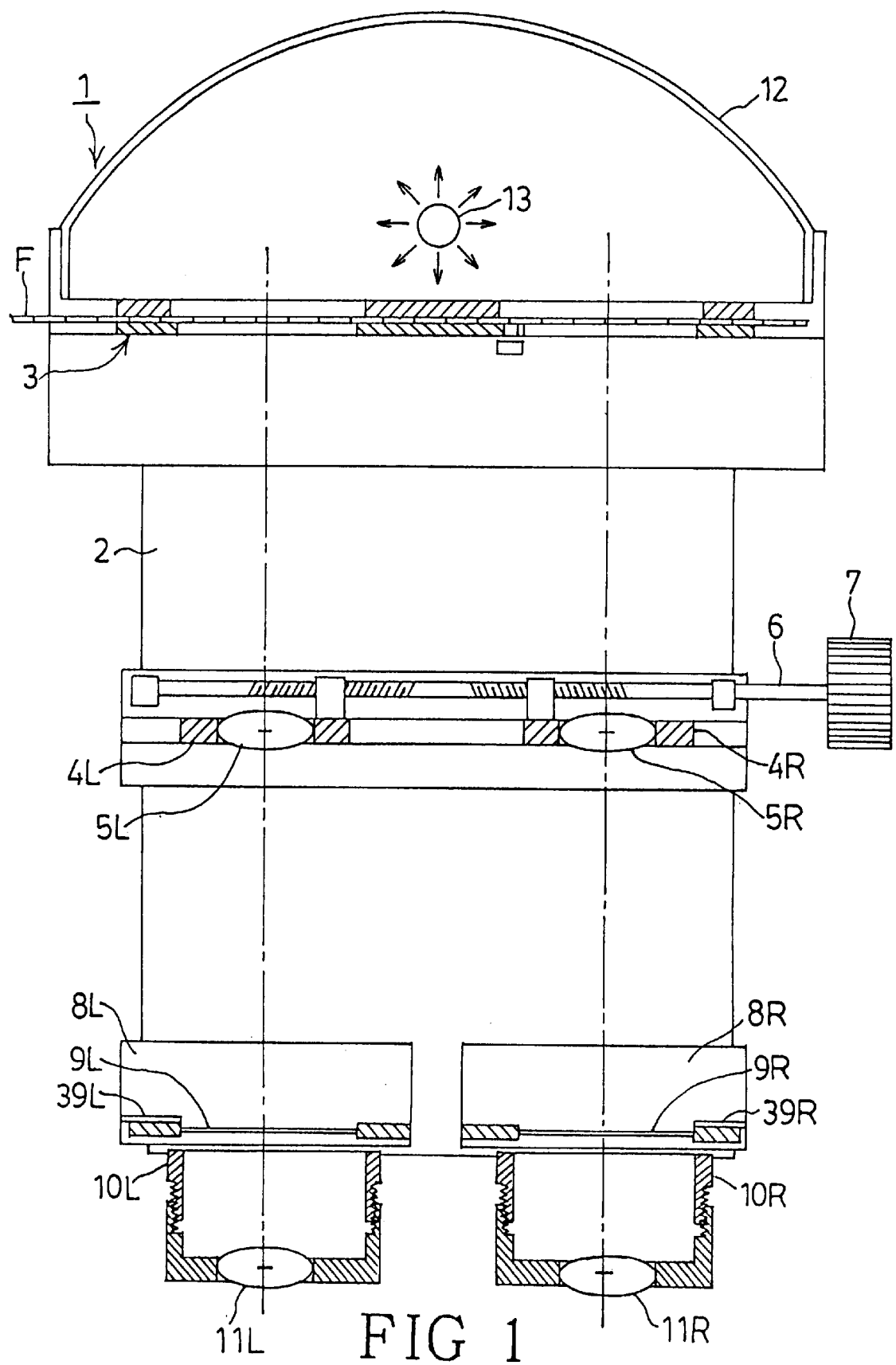
FIG. 1 is a plan view of a stereo slide viewer of claim 1.

Embodiments of the present invention will now be described in detail. FIG. 1 illustrates a stereo slide viewer 1, wherein a film feeder 3 for feeding a roll film F of a long winding is mounted at the rear of a table 2, a pair of right and left projection lens holders 4R and 4L are provided at the back and forth intermediate portions of the table 2, and projection lenses 5R and 5L are mounted at the projection lens holders 4R and 4L. Nuts are formed at the projection lens holders 4R and 4L. Feed screws 6 installed at the table 2 is coupled to the nuts of the projection lens holders 4R and 4L by ball screw mechanisms. Left-hand threads and right-hand threads are cut symmetrically from the intermediate portion to the left and the right. A lens distance adjusting knob 7 mounted at the end of the feed screw 6 is rotated to separate or approach the right and left projection lens holders 4R and 4L in a direction perpendicular to the optical axis, thereby adjusting the distance between the optical axes of the projection lenses 5R and 5L.

A pair of right and left focal plates 8R and 8L are mounted at the front of the table 2, and focal plates 9R and 9L of the entire mat surface are mounted at the focal plate holders 8R and 8L. Eyepiece holders 10R and 10L opposed to the focal plates 9R and 9L are fixed to the front end of the table 2, and eyepieces 11R and 11R are mounted at the eyepiece holders 10R and 10L. The eyepiece lense 11R and 11R are moved back and forth by rotating a lens barrel to thereby adjust the dioptric power to meet the user's eyes. It is desired to set the pitch between the centers of the focal plates 9R and 9L and the eyepieces 11R and 11L to about 63.5 mm of human standard pitch between two eyes.

A semicircular reflecting plate 12 is fixed to the rear end of the table 2, an illumination bulb 12 is mounted in an inner space formed by the reflecting plate 12 and the film feeder 3 to constitute a diffusing light source, thereby uniformly illuminating the back surface of the film feeder 3.

Figure 2:
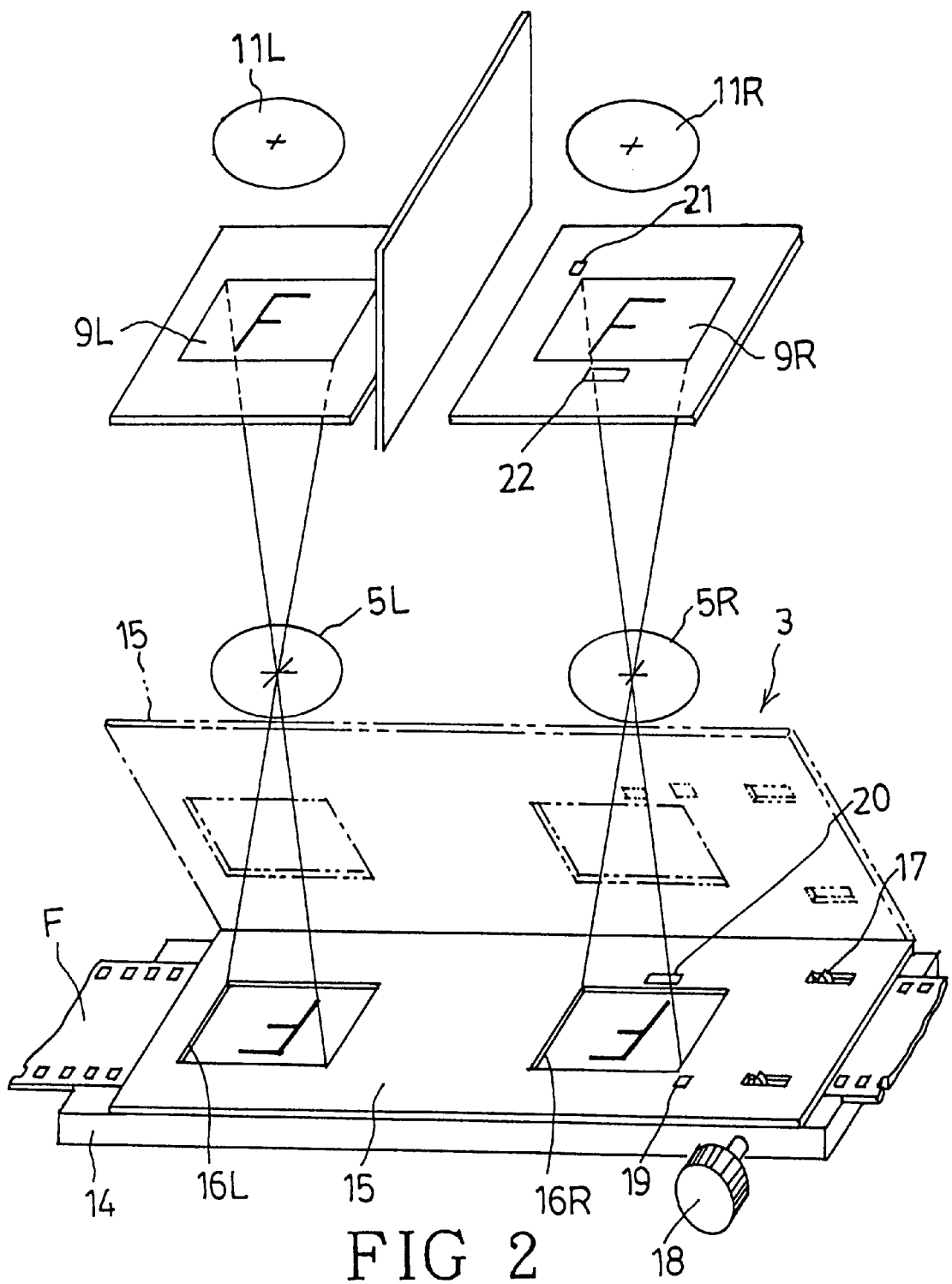
FIG. 2 is a perspective view of a manual film feeder.

FIG. 2 illustrates the film feeder 3, wherein an openable retaining cover 15 is pivotally secured to a film guide table 14 having guide slots of the width equal to that of the film. Windows 16R and 16L of the size and the pitch corresponding to those of a picture array format of the stereo camera are provided at the right and left of the film guide table 14 and the retaining cover 15.

The film feeder 3 of FIG. 2 corresponds to that of the stereo camera of the picture array format in which one picture of other set is inserted between a pair of right and left pictures. In addition, there are stereo cameras of various picture pitches in which a pair of right and left pictures are disposed adjacently, or other two sets of pictures are disposed in two frames between a pair of right and left pictures, and the film feeder can be replaced with the film feeder of the window pitch for each of the stereo cameras.

Figure 3:
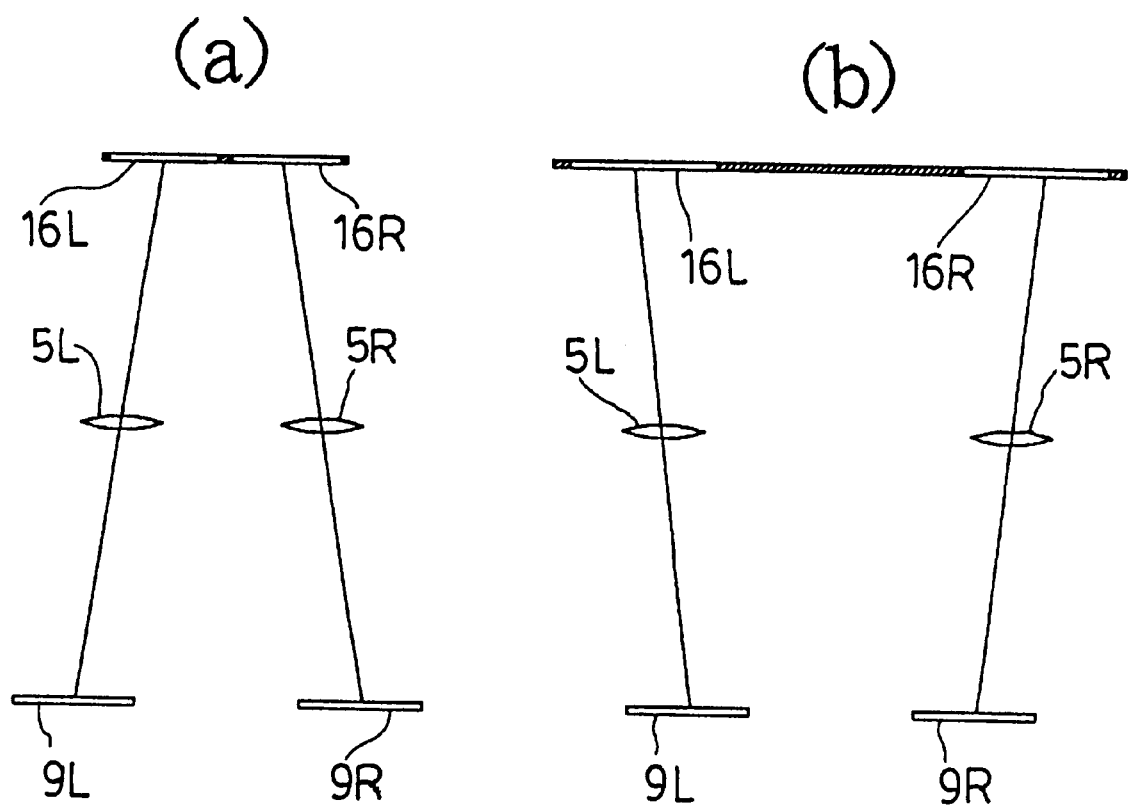
FIGS. 3(a) and 3(b) are explanatory views showing the state of adjusting a distance between the optical axes of projection lenses.

When the film feeder 3 is replaced, the lens distance adjusting knob 7 is operated to adjust the distance between the projection lenses 5R and 5L so that the centers of the projection lenses 5R and 5L are disposed on a straight line for connecting the centers of the right and left focal plates 9R and 9L to the centers of the windows 16R and 16L of the film feeder 3 as shown in FIGS. 3(a) and 3(b), thereby focusing a set of images on the right and left focal plates 9R and 9L.

Identifying means such as an electric contact or a type identifying hole is provided at the film feeder and an electric, magnetic or optical sensor is provided in a stereo slide viewer body to constitute a film feeder identifying mechanism, and a motor is disposed in a distance adjusting mechanism of the projection lenses 5R and 5L, and the distance between the projection lenses 5R and 5L may be automatically adjusted in response to the type of the film feeder by a controller.

The film feeder 3 illustrated in FIG. 2 is used for a 135 film. A sprocket wheel 17 to be engaged with the perforations of the 135 film is mounted at the film guide table 14, and a roll film F can be fed by rotating a feed knob 18 fixed to the end of the shaft of the sprocket wheel 17.

Though omitted in drawings, a film supply spool and a film take-up spool are mounted at both ends of the film guide table 14 to provide a winding and rewinding mechanism similar to the general-purpose camera, a roll film is taken up on the film take-up spool from the film supply spool, and may be rewound on the film supply spool after the appreciation. A feeding mechanism or a take-up spool driving mechanism by a pinch roller is used instead of the feeding mechanism by the sprocket wheel 17 to thereby feed the film having no perforation such as a 120 roll film.

Figure 4:
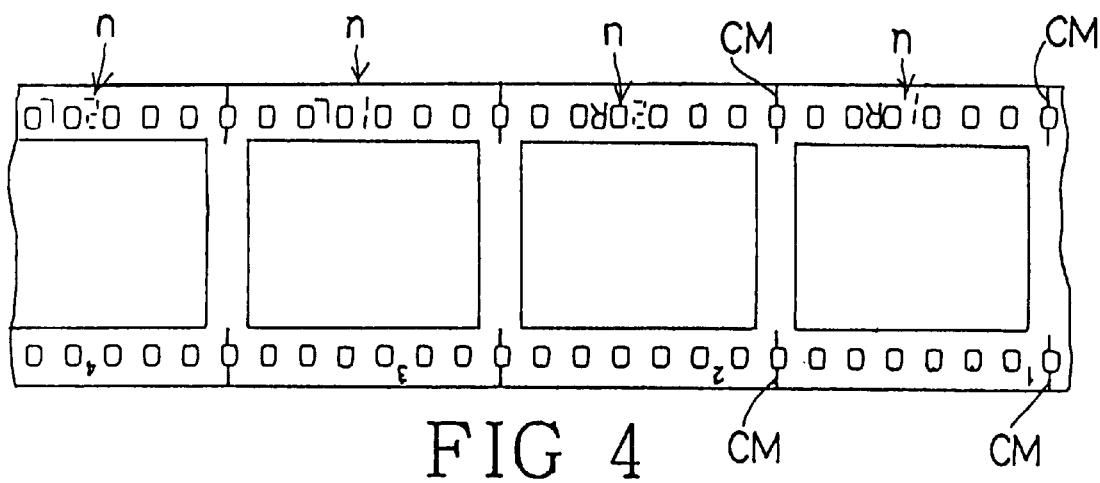
FIG. 4 is a front view of a photographed 135 roll film, illustrating an example of a picture array of a stereo camera.

FIG. 4 illustrates an example of a picture array format of a stereo camera. Pictures are disposed from the head of a 135 roll film in the order of 1R, 2R, 1L 2L, 3R, 4R, 3L, 4L, . . . . , and upside down and left side right inverted images are exposed at the pictures. The upside down and left side right inverted images on the roll film F are inverted by the projection lenses 5R and 5L of the stereo slide viewer 1, focused as erect images on the focal plates 9R and 9L, and the erect stereo image can be appreciated through right and left eyepieces 11R and 11L.

The applicant of the present invention has proposed a stereo camera in which cutting marks CM and frame numbers nR and nL to be an index of cutting between the pictures of a film F are exposed at the time of taking a picture, by referring to FIG. 4. By referring back to FIG. 2, cutting mark projection window 19 and a frame number projection window 20 are provided at the film guide table 14 and the retaining cover 15, and a cutting mark projected portion 21 and a frame number projected portion 22 are provided on the focal plate 9R, thereby accurately aligning the pictures of the film F with the windows 16R and 16L and visually recognizing the frame number.

Figure 5:
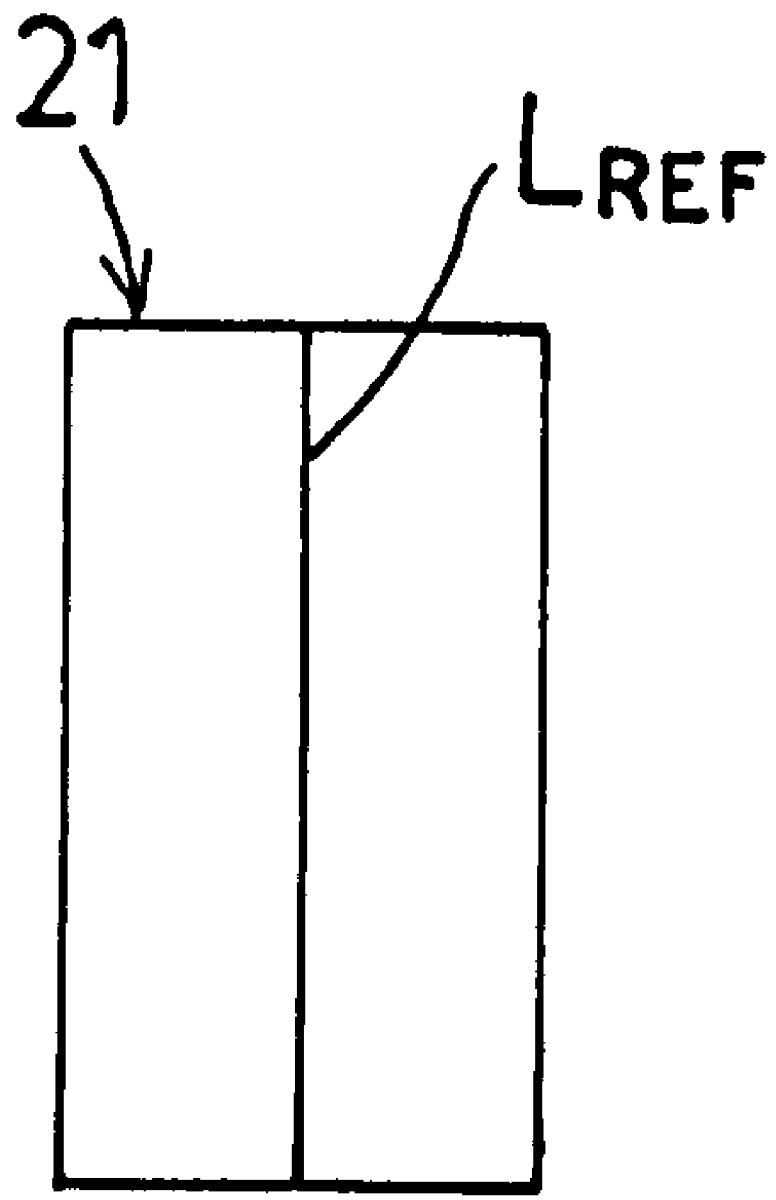
FIG. 5 is a front view of a cutting mark projected portion of a focal plate.

Referring to FIG. 5, an index line $L_{REF}$ similar to the cutting mark CM is printed on the cutting mark of projected portion 21 of the focal plate 9R, and the relative positional relationship between the index line $L_{REF}$ and the picture area of the focal plate 9R is equal to the positional relationship between the photographed picture on the roll film F and the cutting mark CM. Therefore, if the cutting mark CM projected to the cutting mark projected portion 21 is brought into coincidence with the index line $L_{REF}$, the position of the windows 16R and 16L coincide with the pictures of the film F.

Figure 6:
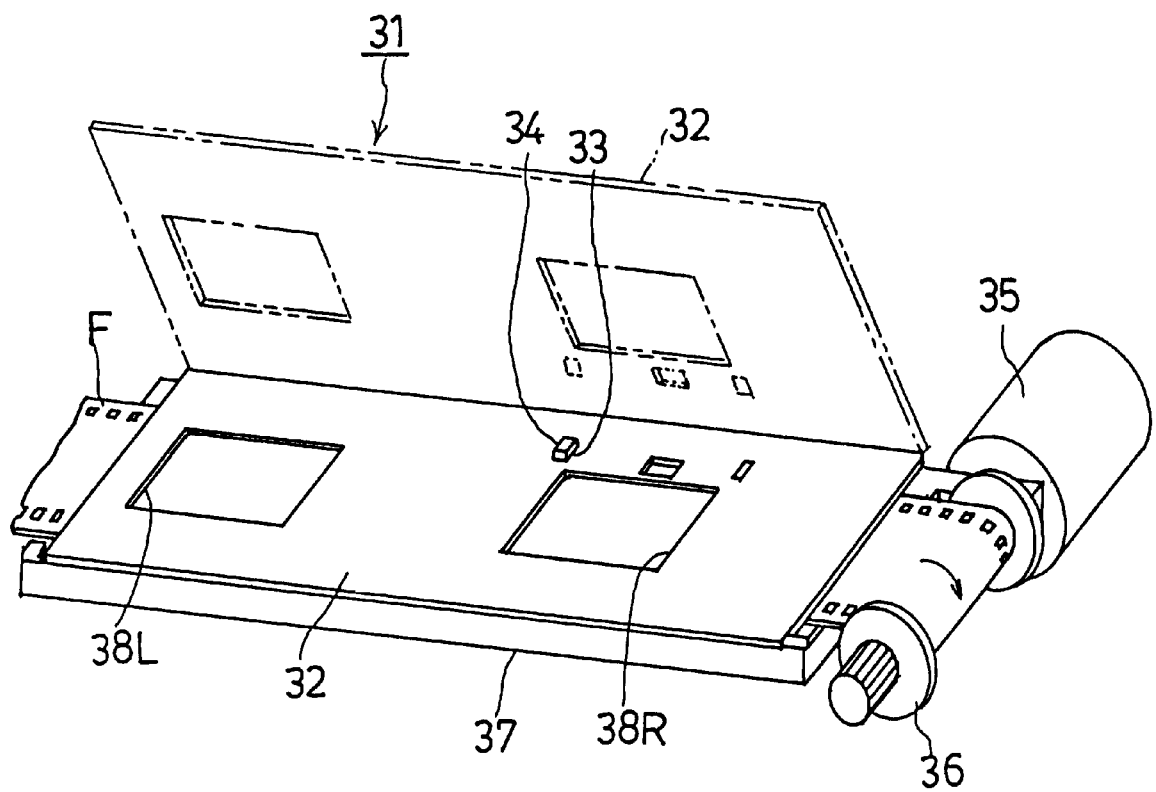
FIG. 6 is a perspective view of a motor-driven film feeder.

Furthermore, the film feeding can be automated by utilizing the cutting mark CM. Referring to FIG. 6, an optical sensor 34 is provided in the cutting mark projection window 33 of the retaining cover 32 of a motor-driven film feeder 31, and a feed controller (not shown) for controlling a winding motor 35 according to the cutting mark detection signal of the optical sensor 34 is provided.

The head of the roll film F is locked to a take-up spool 36, and the retaining cover 32 is superposed on a film guide table 37. When a feed execution signal is input to the feed controller by operating means such as a feed button, the winding motor 35 is rotatably driven to wind the roll film F. When the cutting mark CM on the first picture is detected by the optical sensor 34, the winding is stopped, and the pictures of the first set are disposed at windows 38R and 38L.

Frame feeding or one frame rewinding is executed by the feed controller in response to the operation of the button, stopped at the position where the corresponding cutting mark is detected by the optical sensor 34, and the stereo pictures can be continuously appreciated only by the operation of the button.

In the roll film photographed by the stereo camera of the picture array format illustrated in FIG. 4, after the set of the 1R and 1L are appreciated, when the film is fed by one frame, the 2R and 2L are represented in the windows, and it is then necessary to feed three frames to observe the 3R and 3L. In this manner, a labor hour of alternately feeding the one frame and the three frames must be required. In order to eliminate the labor hour, the means for automatically controlling the winding mechanism by the motor based on the picture array format of the stereo camera is effective.

Though omitted in the drawings, as the automatic control means for winding, there is means for reading data by coating the edge of the roll film with a magnetic recording material to record position information and frame number information and providing a magnetic head at a film guide table. In this case, the magnetic head is provided at the film guide table, the position information and the frame number information are recorded by data recorder/reproducer, or the magnetic head and the data recorder are provided in the stereo camera to record the information on the film at the time of taking a picture.

If information is recorded by the film feeder, a roll film is first mounted at the film feeder, the film is fed manually or by a motor to align the pictures with the windows, and the data recorder/reproducer is operated at the position to record the information on the respective pictures.

If magnetic recording information is used, various information can be recorded in addition to the position information and the frame number information. For example, jump information is recorded on the picture failed to take a picture in the one roll film to automatically skip the unnecessary picture at the time of feeding to next picture.

The above-mentioned stereo slide viewer 1 has fixed ratios of visual fields on right and left pictures. In a stereo camera having a mechanism for adjusting a distance between the optical axes of photographing lenses as proposed by the applicant of the present invention, optimum stereo effect is obtained in all pictures of the film in which a parallax is corrected in response to the photographing distance. However, as described above, in the film which is taken by a stereo camera having no mechanism for adjusting the distance between the optical axes, there might be unnatural in the stereo effect according to the photographing distance of an object. In order to eliminate this problem, referring to FIG. 1, picture mask shutters 39R and 39L for shielding the outsides of the right and left focal plates 9R and 9L are provided or shutters for shielding the insides of the right and left windows of the film feeder 3 are provided, and the outer areas of the erected pictures are suitably masked in response to the photographing state to appreciate by the optimum stereo effect. The picture mask shutters 39R and 39L may be adjusted manually or a motor by providing an adjusting mechanism for interlocking them symmetrically by feed screws. The mask amounts of the respective pictures are determined by test appreciation, the mask amounts are recorded on the film F as the magnetic recording information as described above, and the shutter driving motor is automatically controlled by the controller, and hence the manual operation can be eliminated.

Figure 7:
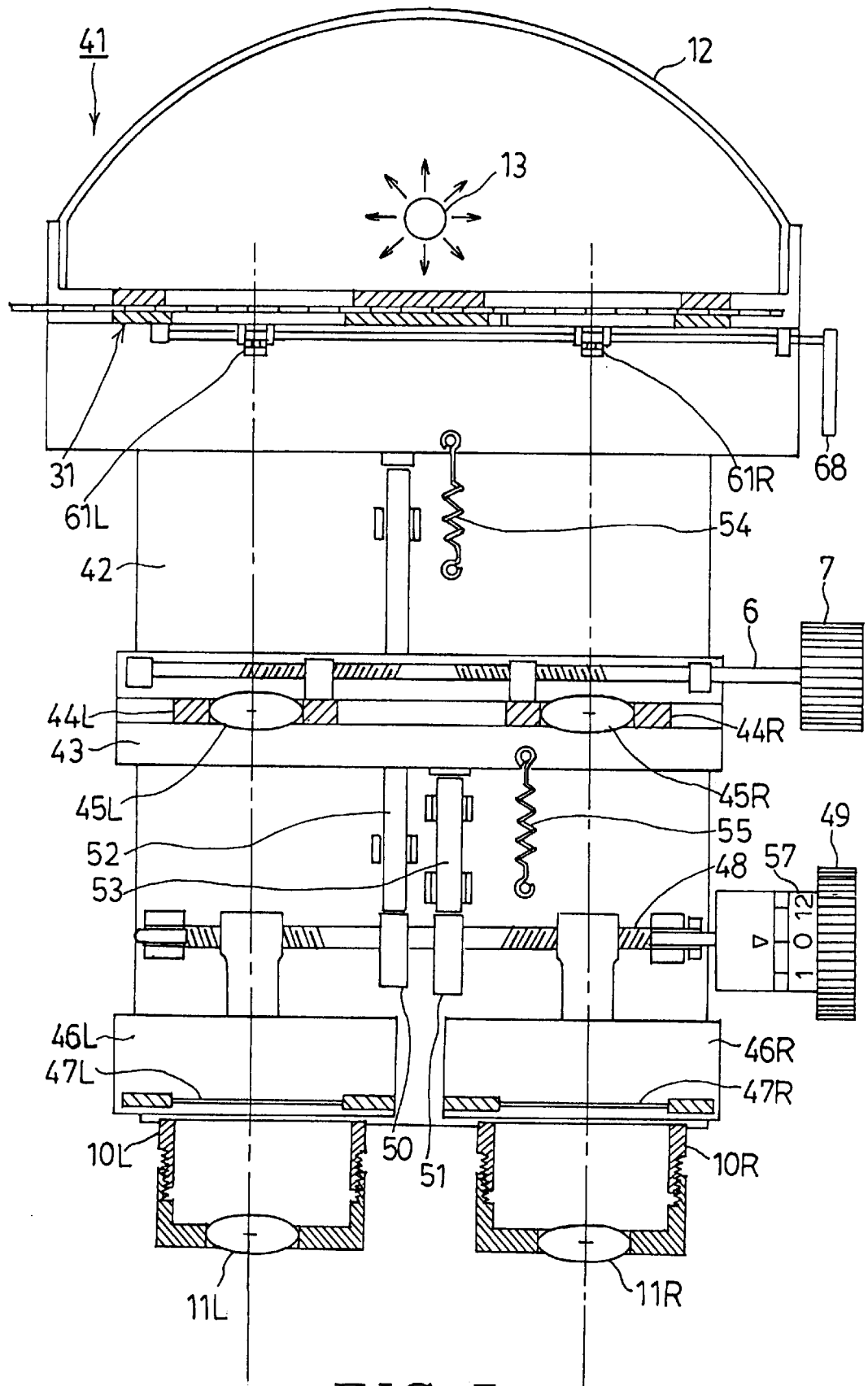
FIG. 7 is a plan view of a stereo slide viewer of claim 2.

A stereo slide viewer 41 shown in FIG. 7 has a manual or motor-driven film feeder 31 described above mounted at the rear of a slide guide table 42, and a projection lens base 43 mounted at the front of the film feeder 31 so that the film feeder 31 and the projection lens base 43 are slidable in a direction of an optical axis. A pair of projection lens holders 44R and 44L are mounted at the projection lens base 43. Lens distance adjusting mechanisms by ball screws as described above are provided at the projection lens holders 44R and 44L to adjust the distance between the optical axes of the projection lenses 45R and 45L.

A pair of right and left focal plate holders 46R and 46L are mounted at the front of the slide guide table 42, and the focal plates 47R and 47R of the focal plate holders 46R and 46L can be replaced. Similar to the stereo slide viewer 1 of FIG. 1, eyepiece holders 10R and 10R opposed to the focal plates 47R and 47L are fixed to the front end of the slide guide table 42, and a dioptric power can be adjusted by rotating the lens barrel of the eyepieces R and L of the eyepiece holders 10R and 10L. A diffusing light source of a semicircular reflecting plate 12 and an illuminating bulb 13 is provided at the rear end of the slide guide table 42.

The focal plate holders 46R and 46L are mounted, similar to the projection lens holders 44R and 44L, at a ball screw mechanism. Feed screws 48 of the ball screw mechanism are right-hand threads at the right side and left-hand threads at the left side. The right and left focal plate holders 46R and 46L are separated or approached in a direction perpendicular to the optical axis by rotating the focal plate distance adjusting knob 49 mounted at the end of the feed screw 48, and the distance can be adjusted in a predetermined range in the direction approaching to each other from the reference pitch at the pitch of the focal plates 47R and 47L.

Two cam plates 50 and 51 for individually moving the film feeder 31 and the projection lens base 43 are mounted at the intermediate position of the feed screw 48. Tappet rods 52 and 53 are interposed between the film feeder 31 and the cam plate 50 and between the projection lens base 43 ad the cam plate 51, and the film feeder 31 and the projection lens base 43 are brought into pressure contact with the cam plates 50 and 51 via the tappet rods 52 and 53 by being energized by tensile coils 54 and 55. Therefore, the film feeder 31 and the projection lens base 43 are interlocked to the rotations of the cam plates 50 and 51 by rotating the focal plate distance adjusting knob 49, and moved back and forth in a range between the foremost position of 1:1 of an image magnification and the rear enlarged projection position. The two cam plates 50 and 51 are so formed that the projected images on the focal plates 47R and 47L become the moving ratio of always maintaining a focused state within the moving range of the film feeder 31 and the projection lens base 43, thereby enlarging the projected picture at an arbitrary magnification.

When the film feeder 31 and the projection lens base 43 are moved in a direction of enlarging the projected picture, the focal plate holders 46R and 46L are interlocked to approach to each other at the distance, and erected images on the right and left focal plates 47R and 47L are masked at the outsides by the picture frames of the focal plates 47R and 47L.

At this time, if it is assumed that the real picture widths of the stereo slides and the picture widths of the focal plates 47R and 47L are 30 mm, the projection picture width when the pictures of the slides are, for example, enlarged and projected becomes 30×30/29=31.034 (mm), and the difference of the projection picture width from the 30 mm of the picture widths of the focal plates 47R and 47L is 31.034−30=1.034 (mm). That is, if the focal plates 47R and 47L are disposed at the initial positions shown in FIG. 7, the enlarged projection picture exceeds 1.034/2=0.517 (mm) to the right and left outsides of the focal plates 47R and 47L.

The pitch of the feed screw 48 is the pitch of shifting of the right and left focal plate holders 46R and 46L of 0.517 mm to the inside in the case of, for example, the projection enlarging ratio of 30/29. The inside edges of the picture areas of the focal plates 47R and 47L coincide with the inside edge of the slide projection picture irrespective of the projection enlarging ratio, the outside area of the projection picture exceeds the outside of the focal plates to be masked, and the mask area is continuously varied in response to the projection enlarging ratio. Thus, when the roll film photographed by the stereo camera having no mechanism for adjusting the distance between the optical axes is appreciated, the projection enlarging ratio is adjusted in response to the photographing state, and the outside area of the picture is suitably masked to be appreciated with the optimum stereo effect.

Figure 8:
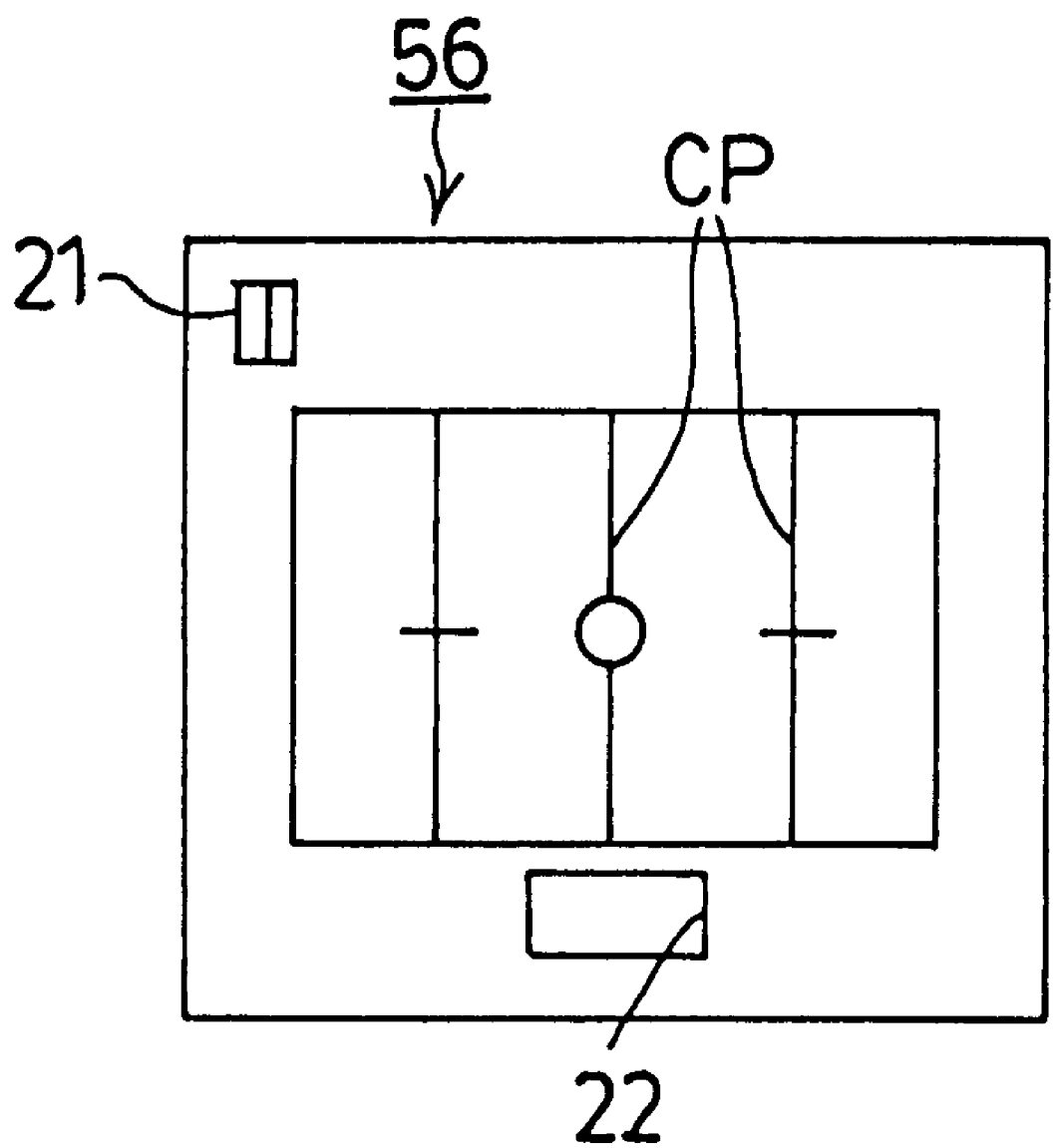
FIG. 8 is a front view of a focal plate for detecting a mask amount.

The stereo slide viewer 41 can be used as a mask amount guiding unit when the film is mounted in a stereo slide mount by replacing the focal plates 47R and 47L of the entire matted surface with a mask amount detecting focal plate 56 having a collimation pattern CP having vertical lines as main bodies as shown in FIG. 8.

When used as a mask amount guiding unit, a stereo image is observed while rotating a focal plate distance adjusting knob 49, the mask amount when the front and rear positions of a subject in a close-range view are substantially equal to the collimation pattern CP of the right and left mask amount detecting focal plates 56R and 56L or in the state observed in the depth of the collimation pattern CP becomes a suitable mask amount, and accurate stereo images can be reproduced by mounting the film in the stereo slide mount having the window width meeting the conditions.

As shown in FIG. 7, the same number as a mount number is displayed at the rotary position of the stereo slide mount or a framing mask (a plurality of types of stereo slide mount or a framing mask having a film positioning pin and different window widths) proposed by the applicant of the present invention corresponding to the picture shielding ratio on a dial 57 of the focal plate distance adjusting knob 49. Therefore, if the number of the dial 57 is observed when the subject in a close-range view is disposed at the front or rear position substantially equal to the collimation pattern CP of the mask amount detecting focal plates 56R and 56L or becomes the state observed in the depth of the collimation pattern CP, the suitable number of the stereo slide mount or the framing mask can be recognized, and the mount can be easily and accurately conducted.

The mounting work of the film having no perforation such as a 120 film can be facilitated similarly to the 135 film by providing punching units 61R and 61L in the film feeder 31 as shown in FIG. 7.

Figure 9:
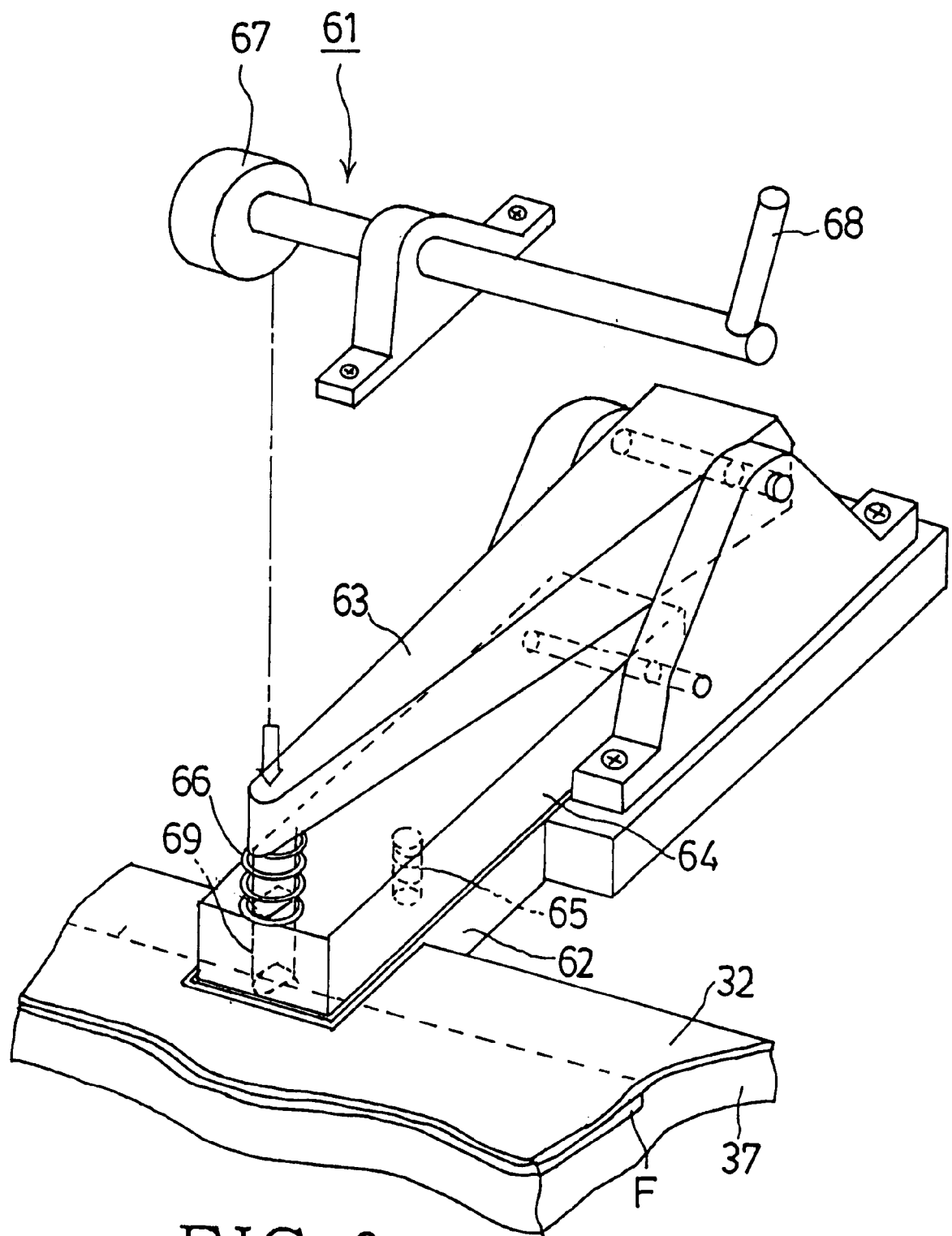
FIG. 9 is an exploded perspective view of a punching unit.

Referring to FIG. 9, a die 62 of the punching unit 61 is coupled to the film guide table 37 of a film feeder 31, and a punch holder 63 and a film retaining arm 64 are vertically rotatably secured to the die 62. Compression coiled springs 65 and 66 are mounted at the die 62 and the film retaining arm 64 as well as the film retaining arm 64 and the punch holder 63, and the punch holder 63 and the film retaining arm 64 are floated from the die 62. A cam 67 is disposed above the punch holder 63, and the punch holder 63 and the film retaining arm 64 are moved down by rotating an operating lever 68 fixed to a cam shaft.

When the cam 67 pushes the upper surface of the punch holder 63, the punch holder 63 and the film retaining arm 64 are integrally moved down, the film is sandwiched between the film retaining arm 64 and the die 62 to be fixed. Then, when the operating lever 68 is further rotated, the punch holder 63 compresses the compression coiled spring 66 to move it down, the punch 69 mounted at the end of the punch holder 63 is engaged with the die 62 to punch the edge of the film F, thereby forming a notch.

Figure 10:
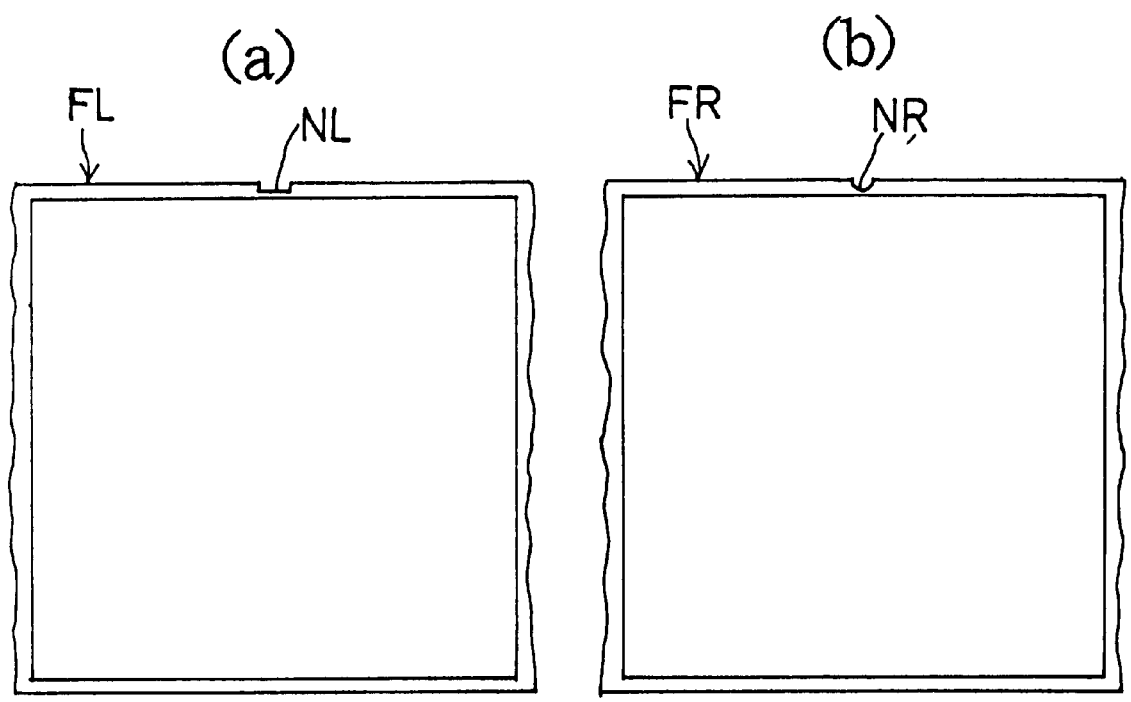
FIGS. 10(a) and 10(b) are front views of a film in which notches are formed by the punching unit.

When the stereo slide is cut at each one frame, it is not easy to identify a left side film from a right side film. However, the punches of the right and left punching units 61R and 61L and the shapes of the dies are differentiated, and the shapes of the notches NR and NL of the right side film FR and the left side film FL are differentiated as shown in FIG. 10, and hence the right side film FR can be identified from the left side film RL.

Figure 11:
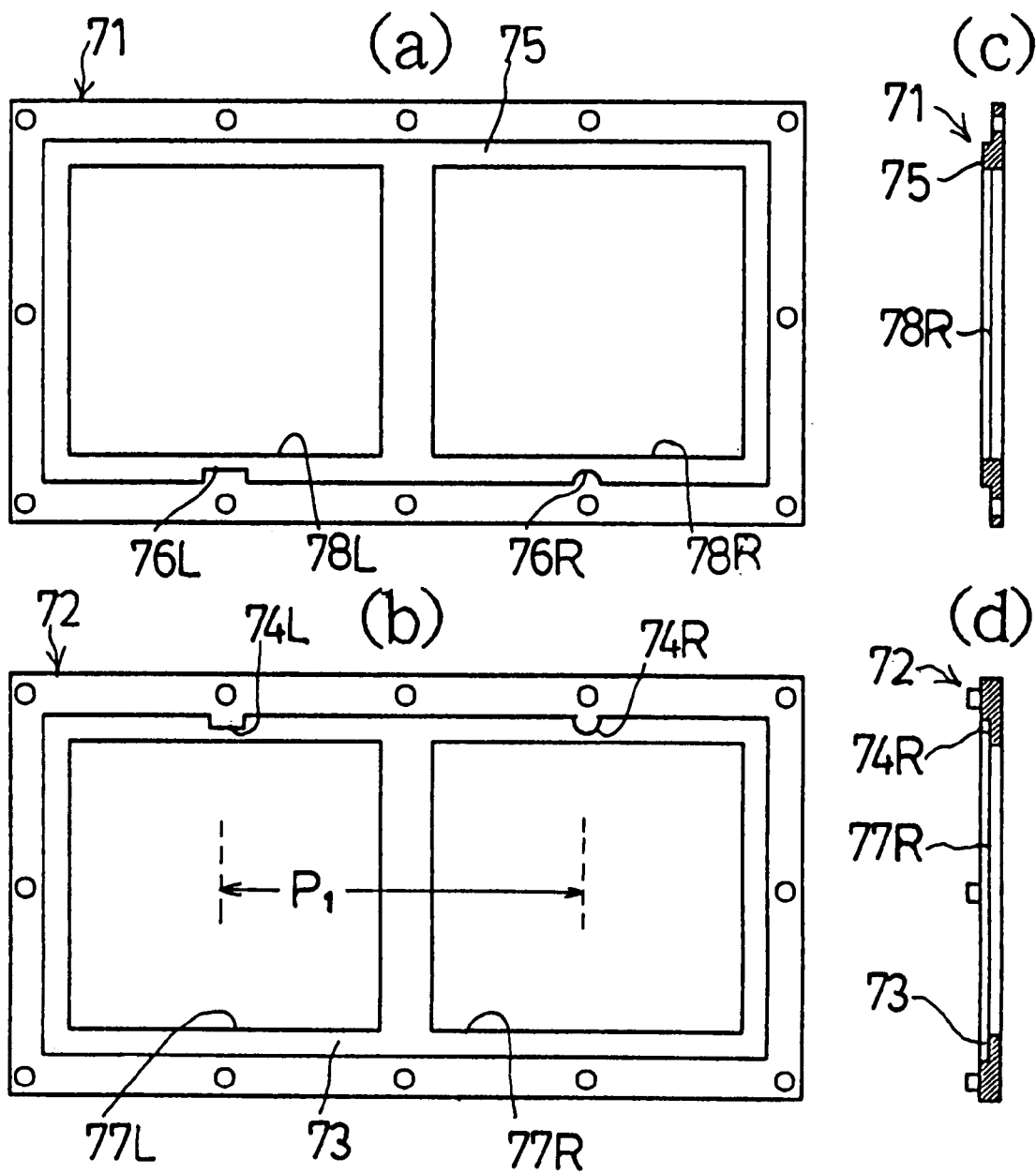

FIG. 11 illustrates a stereo slide mount for a 120 film having a cover frame 71 in FIG. 11(a) and a base frame 72 in FIG. 11(b). Projections 74R and 74L of the shapes engaged with the notches of the film are provided at the upper edge of a recess film placing portion 73 formed at the base frame 72, and the projections 74R and 74L are disposed on the centerlines of the right and left windows. A film retaining portion 75 of the protruding surface engaged with the film placing portion 73 of the base frame 72 is formed at the cover frame 71 engaged with the base frame 72, and the film retaining portion 75 has a symmetrical shape including recesses 76R and 76L corresponding to the protrusions 74R and 74L of the base frame 72.

The stereo slide mount is desired to set, similar to the stereo slide mount or the framing mask proposed by the applicant of the present invention as described above, the pitch $P_1$ of the right and left windows 77R and 77L of the base frame 72 to about 63.5 mm similar to the pitch of human two eyes. The aspect ratio of the windows 77R and 77L is the same as or slightly larger than the picture size of the slide film F, so that the entire picture of the film F can be seen. When one set of slide films F cut at each one frame are placed on the film placing portion 73 and the notches NR and NL are engaged with the protrusions 74R and 74L, the centers of the windows 77R and 77L coincide with the centers of the pictures of the slide film F.

Referring to FIG. 12, the cover films 71 engaged with the base frames 72 of a plurality of types in which the distance of the right and left windows 78R and 78L and the widths of the windows are equal to the distance $C_1$ of the windows and the width $W_0$ of the window of the base frame 72 are equal (#0) to the distances $C_1$ of the windows is equal and the widths W of the windows are gradually stepwisely decreased (#1, #1, #3, . . .) are prepared.

When the cover frame 71 of the number obtained by the mask amount detecting work using the stereo slide viewer 41 is joined to the base frame 72, the stereo slide of the suitable picture mask amount can be formed in response to the photographing state.

Figure 13:
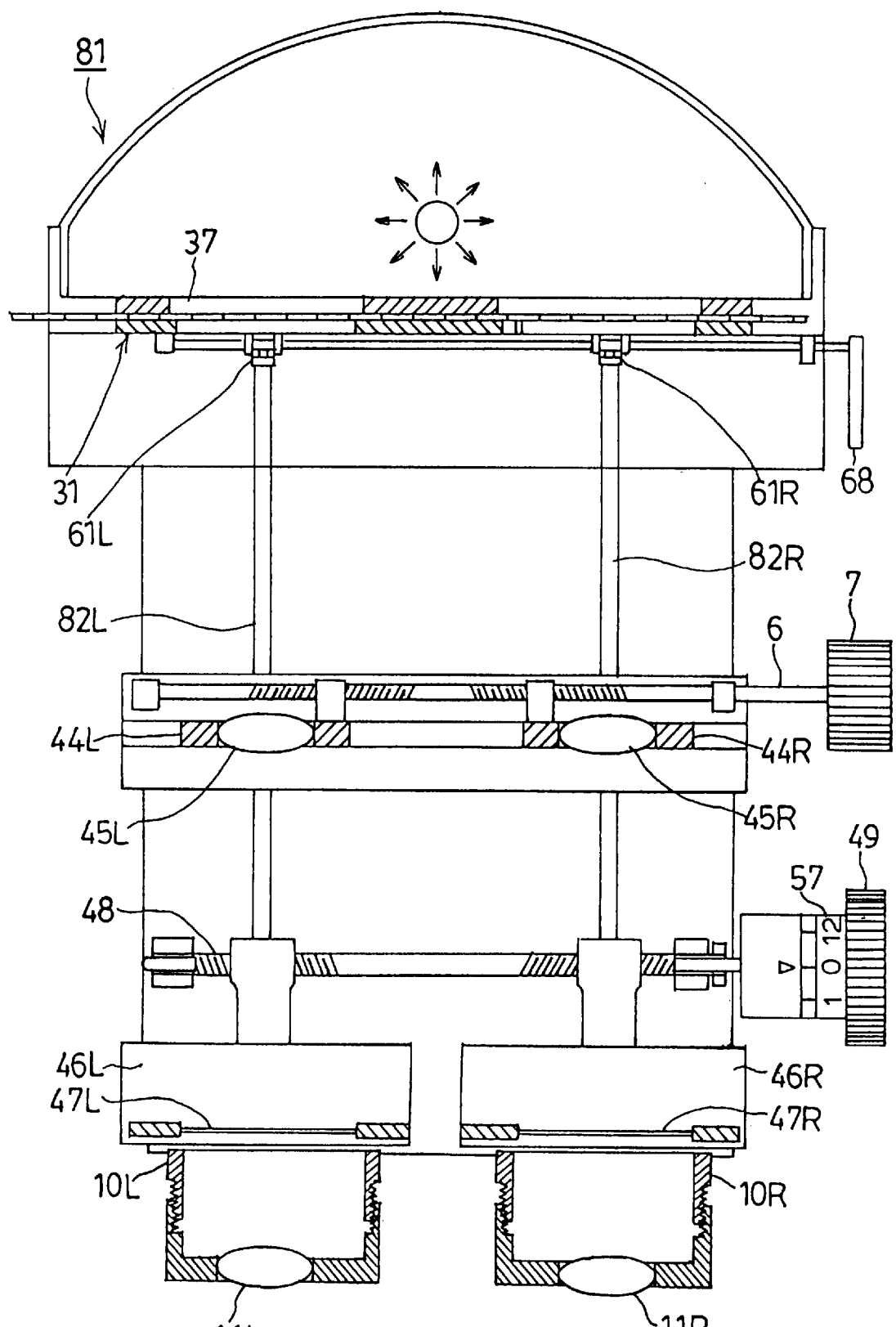
FIG. 13 is a plan view of a stereo slide viewer of claim 12.

A stereo slide viewer 81 shown in FIG. 13 has no mechanism for adjusting a projection magnification, and has a distance adjusting mechanism of projection lenses 45R and 45L and a distance adjusting mechanism of focal plates 47R and 47L equal to those of the stereo slide viewer 41 of FIG. 7 to be placed. Punching units 61R and 61L are mounted movably along the film guide table 37 of a film feeder 31.

Figure 14:
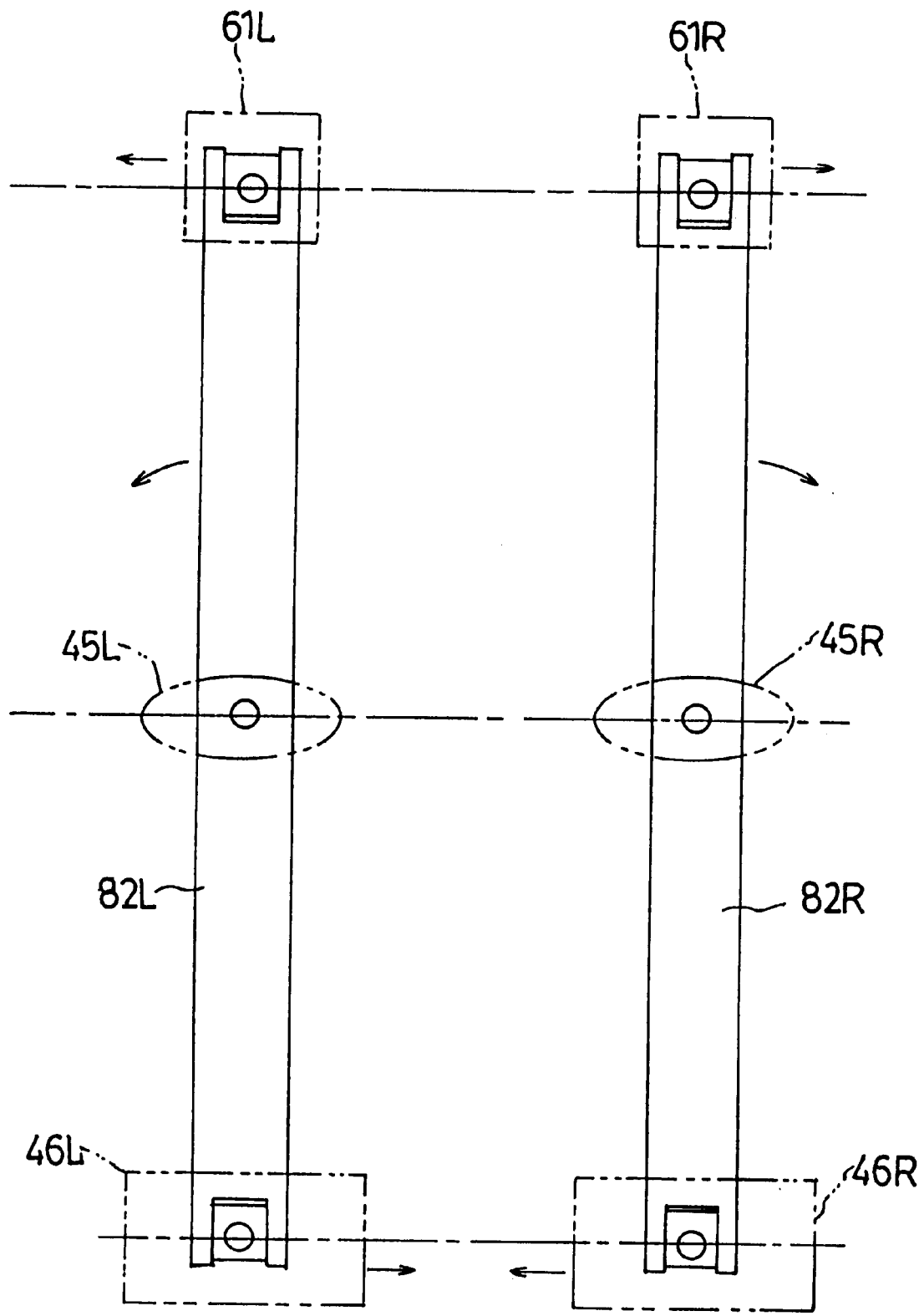
FIG. 14 is an explanatory view of an interlocking mechanism of a punching unit of a stereo slide viewer of claim 12 to a focal plate.

Levers 82R and 82L are secured horizontally rotatably to right and left projection lens holders 44R and 44L, and the rotating fulcra of the levers 82R and 82L are disposed at positions equal to the optical centers of the projection lenses 45R and 45L. As shown in FIG. 14, one ends of the levers 82R and 82L are engaged with focal plate holders 46R and 46L, and the other ends are engaged with the punching units 61R and 62L. When the focal plate distance adjusting knob 49 is rotated to move the focal plate holders 46R and 46L in an approaching direction, the interval of the punching units 61R and 61L symmetrically increases, and the positions of the notches NR and NL formed at the film F are offset from the centers of the upside down and left side right inverted picture to the outside, i.e., to the inside of an erected picture. Therefore, when the film formed with the notches in this manner is cut at each frame and mounted in the stereo slide mount, the near the distance of the subject of the film is, the greater the pitch of the pictures is increased, the outside area of the erected picture is masked by the stereo slide mount, the parallax of the subject in a close-range view is corrected, and the stereo slide of suitable picture mask amount can be formed in response to the photographing state.

If the notches NR and NL are formed at the film F by the stereo slide viewer 81, since the pitch of the pictures of the film is increased larger than the pitch of the pictures of the stereo slide mount to be frequently mounted, there arises the necessity of forming slightly narrower in the window width of the stereo slide mount so that the peripheral edge of the picture inside the picture is not exposed within the window of the mount. However, it is not necessary to record the number of the conforming cover frame 71 by detecting the mask amount and to prepare cover frames 71 of various window widths different from the stereo slide viewer 41 in which the notch positions are fixed, but the film can be mounted uniformly in the stereo slide mount having a predetermined window width, and hence the mounting work is advantageously facilitated.

The stereo slide viewer of the present invention as described above can appreciate the roll film of the long winding as it is. Therefore, the labor hour of replacing the stereo slide mount one by one is eliminated, and the one film can be continuously appreciated.

Even when the film is mounted in the stereo slide mount, the suitable mask amount can be detected before each one frame is cut, and hence the efficiency of mounting process can be remarkably improved.

When the notch is formed at the film having no perforation such as a 120 film by the stereo slide viewer having punching units so that the film is mounted in the stereo slide mount of the present invention, the film is accurately positioned to sufficiently perform the visual effect of the stereo photograph, and hence the complexity and the inaccuracy of the mounting work of the conventional stereo slide are eliminated.

The projection magnification varying mechanism and the focal plate distance adjusting mechanism may be constituted instead of a shown manual type by driving movable units by a servo motor and mounting an electric, magnetic or optical positional sensor at the movable units to feedback control it by a position controller. The constitutions of the units can be modified in a variety of ways within the technical scope of the invention, and it should be noted that the present invention encompasses such modified embodiments, as a matter of course.

I claim:

1. A stereo slide viewer used in a stereo slide mounting system comprising:

a source of illumination;

a film feeder placed adjacent said source of illumination;

a pair of projection lenses;

a pair of focus plates, each of said pair of focus plates having a collimation pattern thereon;

a focus plate feed screw coupled to said pair of focus plates, said focus plate feed screw having right-hand threads and left-hand threads with one of said pair of focus plates coupled to the right-hand threads of said focus plate feed screw and the other one of said pair of focus plates coupled to the left-hand threads of said focus plate feed screw;

a dial coupled to said focus plate feed screw; and a linkage coupling said film feeder and said pair of projection lenses together, whereby the movement of said film feeder and said pair of projection lenses is related to the rotation of said focus plate feed screw, whereby an outside area of a picture on said pair of focus plates is suitably masked to be appreciated with an optimum stereo effect and an accurate stereo image can be reproduced by mounting a film in a stereo slide mount having a predetermined window width indicated by said dial.

2. A stereo slide viewer as in claim 1 further comprising:

a pair of eyepieces placed adjacent said pair of focus plates.

3. A stereo slide viewer as in claim 1 wherein:

said linkage comprises a cam and tappet rod.

4. A stereo slide viewer as in claim 1 further comprising:

a plurality of stereo slide mounts, each of said plurality of stereo slide mounts having a different window width, wherein said dial indicates which one of said plurality of stereo slide mounts to use for mounting a film to obtain an optimum stereo effect.

5. A stereo slide viewer as in claim 1 further comprising:

a projection lens feed screw coupled to said pair of projection lenses, said projection lens feed screw having right-hand threads and left-hand threads with one of said pair of projection lenses coupled to the right-hand threads of said projection lens feed screw and the other one of said pair of projection lenses coupled to the left-hand threads of said projection lens feed screw, wherein the distance between said pair of projection lenses may be changed.

* * * * *